United States Patent [19]

Hoyer et al.

[11] Patent Number: 4,492,654
[45] Date of Patent: Jan. 8, 1985

[54] WATER-SOLUBLE AZO COMPOUNDS, A PROCESS FOR THEIR PREPARATION AND THEIR USE AS DYES

[75] Inventors: Ernst Hoyer, Frankfurt am Main; Folker Kohlhaas, Hochheim am Main; Fritz Meininger, Frankfurt am Main, all of Fed. Rep. of Germany

[73] Assignee: Hoechst Aktiengesellschaft, Frankfurt am Main, Fed. Rep. of Germany

[21] Appl. No.: 515,442

[22] Filed: Jul. 20, 1983

Related U.S. Application Data

[63] Continuation of Ser. No. 279,735, Jul. 2, 1981, abandoned.

[30] Foreign Application Priority Data

Jul. 5, 1980 [DE] Fed. Rep. of Germany ....... 3025572

[51] Int. Cl.³ ..................... C09B 33/02; C09B 31/02
[52] U.S. Cl. .................................................. 534/827
[58] Field of Search ........................... 260/185, 190

[56] References Cited

U.S. PATENT DOCUMENTS

| | | | |
|---|---|---|---|
| 3,334,085 | 8/1967 | Geselbracht | 260/185 |
| 3,334,961 | 8/1967 | Kuehne et al. | 8/54.2 |
| 3,457,251 | 7/1969 | Meininger | 260/189 X |
| 3,457,252 | 7/1969 | Meininger | 260/190 X |
| 3,755,290 | 8/1973 | Montmollin et al. | 260/185 X |
| 3,923,778 | 12/1975 | Montmollin et al. | 260/185 X |
| 4,149,850 | 4/1979 | Schlaefer et al. | 8/41 R |
| 4,185,012 | 1/1980 | Meininger | 260/185 X |
| 4,257,770 | 3/1981 | Nishimura et al. | 260/185 X |
| 4,263,206 | 4/1981 | Anderson | 260/185 X |

FOREIGN PATENT DOCUMENTS

| | | |
|---|---|---|
| 1262213 | 3/1968 | Fed. Rep. of Germany . |
| 2417253 | 2/1976 | Fed. Rep. of Germany . |
| 1644198 | 6/1976 | Fed. Rep. of Germany . |
| 712037 | 7/1954 | United Kingdom . |
| 1183661 | 3/1970 | United Kingdom . |

Primary Examiner—Helen M. S. Sneed
Attorney, Agent, or Firm—Curtis, Morris & Safford

[57] ABSTRACT

Disazo compounds corresponding to the general formula (1)

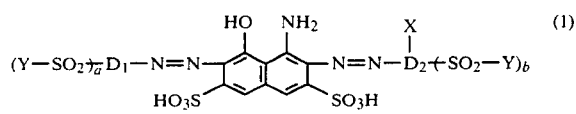

as well as their metal salts, in which $D_1$ denotes the benzene or naphthalene nucleus, which can be further substituted by one or two substituents from the group of fluorine, chlorine, bromine, carboxy, lower alkyl, lower alkoxy and nitro and/or one, two or three sulfo groups, $D_2$ is the benzene or naphthalene nucleus, which is substituted by the substituent X defined below and, in addition to the group $-SO_2-Y$, can be further substituted by one or two substituents from the group of carboxy, lower alkyl and lower alkoxy and/or by one substituent from the group of fluorine, chlorine, bromine and nitro and/or one, two or three sulfo groups, X denotes a fluorine, chlorine or bromine atom, which is necessarily bonded to $D_2$ in ortho-position to the azo group, Y denotes the vinyl, β-sulfatoethyl, β-chloroethyl, β-thiosulfatoethyl or a β-acyloxyethyl group with the acyl radical of a lower alkanecarboxylic acid or of a benzoic acid or of a benzenesulfonic acid, and a and b each represent the number zero or 1, the sum of (a+b) being equal to 1 or 2. These compounds (1) are very suitable as fiber-reactive dyes for dyeing, for example natural or regenerated cellulose fiber, wool or synthetic polyamide fibers. They give on these materials intense dyeings and prints of good fastness properties, and are distinguished, in particular, by a good stability to copper ions, when used in printing processes.

10 Claims, No Drawings

WATER-SOLUBLE AZO COMPOUNDS, A PROCESS FOR THEIR PREPARATION AND THEIR USE AS DYES

Continuation of Ser. No. 279,735, July 2, 1981, abandoned.

The invention concerns the industrial field of the water-soluble acid textile dyes, in particular in the application as fiber-reactive dyes.

A fiber-reactive disazo dye, which is synthesized from 1-amino-8-naphthol-3,6-disulfonic acid as the bivalent coupling component and from 2 moles of 4-(β-sulfatoethylsulfonyl)-aniline as the diazo components, is known from the German Patent Specification No. 2,417,253. Other similar fiber-reactive disazo dyes with a 1-amino-8-naphtholdisulfonic acid coupling component are known from the German Auslegeschrift No. 1,644,198. Although the first-mentioned dye, in particular, shows good wearing properties and, in addition, very good properties in application technology, it has, however, as also the other known disazo dyes mentioned, in addition to all advantages, the disadvantage of undergoing changes in shade in the presence of copper ions, The insensitivity of dyes to copper ions is, however, very significant in practice, since such (metal-free) dyes must also be capable of combination with other fiber-reactive dyes which contain the copper bonded in complex form. Furthermore, if containers made of copper, such as, for example, the trough of a padding mangle, or printing rollers made of copper are used, copper ions can be introduced into dye liquors, padding liquors or printing pastes, and the copper ions then have an undesired effect on the shade of copper-sensitive dyes, such as, for example, the known disazo dye mentioned at the beginning of the text.

With the present invention, new disazo compounds have now been found which have a high stability to copper ions, with otherwise similarly good dyeing properties and fastness properties. These new disazo compounds have the general formula (1)

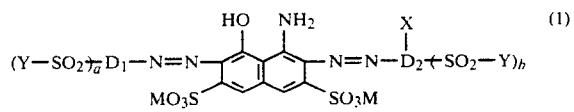

wherein M is hydrogen or the equivalent of a metal, preferably alkali or alkaline earth metal, such as sodium, potassium and calcium, D is the benzene or naphthalene nucleus, which, apart from the group $Y-SO_2-$, can be further substituted by one or two substituents from the group of fluorine, chlorine, bromine, carboxy, lower alkyl, lower alkoxy and nitro and/or one, two or three sulfo groups; $D_2$ denotes the benzene or naphthalene nucleus, which is substituted by the substituent X defined below and which, apart from the group $-SO_2-Y$, can be further substituted by one or two substituents from the group of carboxy, lower alkyl and lower alkoxy and/or by 1 substituent from the group of fluorine, chlorine, bromine and nitro and/or one, two or three sulfo groups, and $D_1$ and $D_2$ can be identical to or different from one another; X is necessarily bonded to $D_2$ in ortho-position to the azo group and denotes a fluorine, chlorine or bromine atom; Y denotes the vinyl, β-sulfatoethyl, β-chloroethyl, β-thiosulfatoethyl or a β-acyloxyethyl group with the acyl radical of a lower alkanecarboxylic acid, such as that of acetic acid, or of benzoic acid optionally substituted by carboxy, sulfo and/or lower alkyl, or of benzenesulfonic acid optionally substituted by carboxy, sulfo and/or lower alkyl; a represents the number zero or 1 and b represents the number zero or 1, and the sum of (a+b) is 1 or 2.

The compounds according to the invention can be present in the form of the free acid as well as in the form of their salts. They are preferred in the form of salts, in particular the alkali metal and alkaline earth metal salts and of these the sodium, potassium and also calcium salts, in particular. The new compounds are used, preferably in the form of the alkali metal salts, for dyeing and printing of fiber materials of natural or regenerated cellulose or also natural, regenerated or synthetic polyamides, and of leather.

The term "lower" used above and in the following text means that the groups so designated contain or consist of alkyl radicals or alkylene radicals of from 1 to 4 C atoms. The substituent X is preferably the chlorine or bromine atom, and $D_2$ preferably represents, the benzene nucleus, which, as indicated above, is substituted by X and can be substituted by the other substituents indicated.

In particular, those azo compounds according to the invention, of the above-defined general formula (1), can be mentioned as being preferred, in which the formula term b represents the number 1, $D_2$ denotes the benzene nucleus, in which the substituent X is in o-position to the azo group, X having the above-mentioned meaning, but is preferably a chlorine or bromine atom, and to which, in addition a substituent from the group of lower alkyl, lower alkoxy, chlorine, bromine and sulfo can be bonded. Furthermore, of these compounds, those may be mentioned as being preferred in which a represents the number 1 and $D_1$ denotes the benzene nucleus, which, in addition, can be substituted by one or two substituents from the group of lower alkyl, lower alkoxy, chlorine, fluorine, carboxy, sulfo and nitro, and the group of the formula $-SO_2-Y$ is bonded to the benzene nucleus in the m- or p-position to the azo group and the formula radicals $Y-SO_2-D_1-$ and $-D_2(-X-)-SO_2Y$ can be identical to or different from one another; further, of the abovementioned preferred azo compounds according to the invention with b equal to 1, those are also preferred in which the formula term a represents the number 1 and $D_1$ denotes the naphthalene nucleus which can be additionally substituted by one or two sulfo groups; and furthermore those compounds are also preferred in which the formula term a represents the number zero and $D_1$ represents the monosulfonaphthyl, disulfonaphthyl or trisulfonaphthyl radical or denotes the phenyl radical which is unsubstituted, but, preferably, is substituted by 1 or 2 substituents from the group of sulfo, carboxy, lower alkyl, lower alkoxy, chlorine, bromine and nitro.

Furthermore, those azo compounds according to the invention are preferred in which the formula index b is equal to zero and a is the number 1, $D_1$, Y and X have the abovementioned particularly preferred meanings and $D_2$ is the naphthalene nucleus, preferably the benzene nucleus, which, in addition to the formula radical X, is substituted by at least one sulfo group and can, in addition, be substituted by a further substituent from the group of lower alkyl, lower alkoxy, nitro and chlorine.

Furthermore, the disazo compounds according to the invention of Examples 1, 3, 6, 27, 31, 42, 43 and 48 below can be emphasized.

The present invention further relates to a process for the preparation of the compounds of the general formula (1). This is a process in which a diazonium salt of an amino compound of the general formula (2)

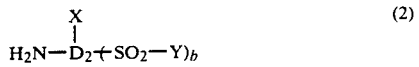
(2)

in which $D_2$, X, Y and b have the meanings mentioned above, is coupled with 1-amino-8-hydroxynaphthalene-3,6-disulfonic acid in a moderately to strongly acidic medium, and the monoazo compound thus prepared is then coupled in a weakly acidic to neutral or weakly alkaline medium with the diazonium salt compound of an amino compound of the general formula (3)

(3)

in which $D_1$, Y and a have the abovementioned meanings, the two aromatic amines of the formulae (2) and (3) being selected so that at least one of them contains a group of the formula —$SO_2$—Y.

The diazotization of the aromatic amines (2) and (3) can be effected by the customary, known procedure, for example in acidic, aqueous medium by means of sodium nitrite at a temperature between —5° C. and +15° C. Likewise, the two coupling reactions are carried out in a procedure which is in itself known. The coupling reaction in the first stage is effected in the acidic range, such as at a pH value between 0.5 and 3, and preferably at a temperature between 5 and 30° C. The coupling reaction in the second stage is preferably effected at a pH value between 4 and 8, in particular between 5 and 7, and, likewise, preferably at a temperature between 5 and 30° C. In the first coupling stage carried out in acidic medium, the coupling occurs in the o-position to the amino group of the aminonaphthol coupling component. The alkali metal salts or alkaline earth metal salts of weak inorganic or organic acids, such as carbonic acid, acetic acid, boric acid, oxalic acid or the acid salts of phosphoric acid are preferably used as the acid-binding agent for the adjustment of the pH range in the second coupling reaction. Sodium and potassium carbonate, sodium acetate, sodium borate and, particularly advantageously, sodium bicarbonate are particularly suitable for this purpose.

Compounds according to the invention, of the general formula (1), in which Y represents the β-sulfatoethyl group, can also be prepared according to the invention in the following manner: one or both of the aromatic amines of the general formulae (2) and (3), in which, however, one of the two Ys or both Ys represent the β-hydroxyethyl group, are coupled with 1-amino-8-naphthol-3,6-disulfonic acid in the procedure given above, and the disazo compound thus prepared, with the constitution of the general formula (1), in which, however, one of the two Ys or both Ys represent the β-hydroxyethyl group, is converted by means of a sulfating agent into the sulfato-compound according to the invention, in a procedure which is in itself known.

The compounds according to the invention may be isolated from their preparation mixtures according to generally known methods for water-soluble compounds, for example by precipitation from the reaction medium by means of an electrolyte, such as, for example, sodium chloride or potassium chloride, or by evaporation of the reaction solution itself, for example, by spray drying. If the last-mentioned type of isolation of the compounds according to the invention is chosen, it is advisable, in cases in which the reaction solution contains relatively large amounts of sulfate, before evaporation to remove the sulfate present in the solutions by precipitation as calcium sulfate and separation by filtration. In some cases, it can also be desirable to use the dye solution for dyeing directly as a liquid preparation, if appropriate, after concentration and/or addition of a buffer substance. The new compounds of the present invention are outstandingly suitable as dyes, in particular as fiber-reactive dyes, for the dyeing or printing of fiber materials of native or regenerated cellulose or of natural, regenerated or synthetic polyamides or polyurethanes, such as, for example, cotton, hemp, linen, jute, filament viscose, wool, silk, polyamide-6, polyamide-6,6, polyamide-11 and polyamide-4, or of leather.

The new compounds are particularly suitable for the dyeing and printing of cellulose-fiber materials.

The new compounds are applied and fixed on the substrates mentioned analogously to known and customary dyeing and printing processes for water-soluble, particularly fiber-reactive, dyes. They have a good to very good solubility and stability in the printing pastes and dyeing baths, and yield, with high degrees of fixation, green-tinged to red-tinged navy blue or green-tinged to blue-tinged black dyeings and printings, which are distinguished, in particular in the case of the dyeings and printings on cellulose fibers, by good to very good wearing properties and stability to manufacturing processes, such as, for example, fastness to light, washing, perspiration, sea water, chlorine bath water, acid and cross-dyeing, as well as fastness to ironing, pleating, decatizing, dry cleaning and rubbing. Portions of dye which are not fixed may easily be washed out.

The present invention thus further relates to the use of the compounds according to the invention for the dyeing or printing of the abovementioned fiber materials or to a process for the dyeing or printing of the abovementioned fiber materials, in which the compounds according to the invention are applied to and then fixed on the fiber material analogously to known and customary procedures of the dyeing and printing industries. For example, these processes are carried out in such a manner that cellulose fiber materials are treated in an aqueous dyeing bath, containing, if appropriate, customary dyeing assistants, according to the exhaustion method from long liquor using alkaline-acting agents, in particular at temperatures between 60° and 105° C., and the fiber material is dyed in very good color yields.

Dyeings with excellent color yields are also obtained on cellulose-fiber materials by meands of the pad processes which are known and customary in the art; this process can be carried out in one or two phases, so that the fixing with the aid of the alkaline-acting agent, which has been applied to the fiber material simultaneously or subsequently to the application of the dye, can be carried out by allowing the padded fiber material to stand for 5 minutes to 20 hours at room temperature or temperatures up to 60° C. or by steaming or by dry-heat treatment. Portions of dye which are not fixed may easily be washed out.

The use of the compounds according to the invention in printing processes is effected analogously to the known and customary printing and fixing methods for the dyeing of cellulose fibers. For this purpose, the following procedure is preferred: a one-phase process is carried out in the presence of sodium bicarbonate or other acid-binding agents, such as potassium bicarbonate, sodium or potassium carbonate, sodium hydroxide, potassium hydroxide or sodium trichloroacetate, in the printing paste, followed by steaming at 101 to 103° C.; or a two-phase process is carried out by printing with a neutral or weakly acidic printing paste, followed by fixing by means of a hot, electrolyte-containing, alkaline bath or by slop-padding with an alkaline, electrolyte-containing liquor and subsequent standing, steaming or dry-heat treatment; intense prints are obtained, with contours of good condition and a clear white ground, Independently of the fixing conditions, the prints exhibit a high constancy of shade.

The dyeing of the polyamide or polyurethane fibers is customarily carried out in acidic medium. Thus, for example, acetic acid or a buffer of acetic acid and ammonium acetate can be added to the dyeing bath in order to obtain the desired ph value. In order to achieve a useful uniformity of the dyeings, it is advisable to add customary leveling assistants, based, for example, on a reaction product of cyanuric chloride with the three-fold molar amount of an aminobenzenesulfonic acid and/or of an aminonaphthalenesulfonic acid, and/or based on a reaction product of stearylamine with ethylene oxide. The dyeings can be carried out at boiling temperature as well as at 110° to 120° C.

The following examples serve to illustrate the invention. The parts given in the examples are parts by weight and the data in percent refer to percent by weight, if not otherwise indicated. Parts by volume relate to parts by weight as liter to kilogram.

EXAMPLE 1

800 parts of ice and 263 parts of a 31% strength aqueous hydrochloric acid are added to a neutral solution of 360 parts of 2-bromo-4-(β-sulfatoethylsulfonyl)-aniline in 1,000 parts of water. The mixture is then diazotized by means of 178 parts of a 40% strength aqueous sodium nitrite solution. After the nitrite excess has been destroyed with amidosulfuric acid, 159.5 parts of 1-amino-8-naphthol-3,6-disulfonic acid are sprinkled into the mixture. After some time, a pH value of 5 to 6 is established by means of sodium bicarbonate, and the reaction mixture is stirred for a further two hours approximately. The disazo compound thus prepared is isolated by spray-drying of the coupling solution, if appropriate after a clarifying filtration. 785 parts of a black, electroyte-containing powder are obtained, which contains 545 parts of the sodium salt of the compound of the formula

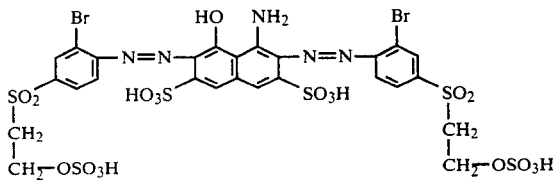

This disazo compound has very good fiber-reactive dye properties and dyes, for example, cellulose fiber materials, such as cotton, according to the dyeing and printing methods which are customary and known in the art and fixing methods current for fiber-reactive dyes, in green-tinged navy blue to green-tinged black shades. The dyeings and prints obtained with this compound exhibit good to very good fastness properties, such as, for example, fastness to washing, perspiration, rubbing, ironing, solvents, cross-dyeing and acid, as well as a good fastness to light.

The dye yields dyeings of constant shade in the presence as well as in the absence of copper ions.

EXAMPLE 2

36 parts of 2-bromo-4-(β-sulfatoethylsulfonyl)-aniline are diazotized analogously to the procedure given in Example 1 and are coupled with 31.9 parts of 1-amino-8-naphthol-3,6-disulfonic acid to give the monoazo compound. After the mixture has been stirred for several hours, the pH value is then adjusted to 6.5 with sodium carbonate and a diazonium salt suspension of 28.1 parts of 4-(β-sulfatoethylsulfonyl)-aniline is then introduced. After the mixture has been stirred for about 2 hours, the reaction has ended. The disazo compound formed is isolated by evaporation or spray-drying of the coupling mixture. A black, electrolyte-containing powder is obtained, which contains the sodium salt of the compound of the formula

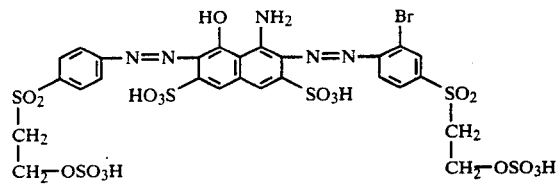

This has very good properties in application technology and dyes, for example, cellulose-fiber materials, according to the application methods and fixing methods customary for fiber-reactive dyes, in navy blue to black shades. The dyeings exhibit good fastness properties, and the dye yields shades which are also stable in the presence of cooper ions.

EXAMPLE 3

200 parts of ice and 27 parts of an aqueous 31% strength hydrochloric acid are added to a neutral solution of 21 parts of 2-chloroaniline-5-sulfonic acid in 300 parts of water and the mixture is diazotized with 20.5 parts by volume of a 5N sodium nitrite solution. Excess nitrite is then destroyed with amidosulfonic acid, and 31.9 parts of 1-amino-8-naphthol-3,6-disulfonic acid are then introduced into the mixture. The reaction mixture is stirred for a further 15 hours approximately, until the end of the coupling reaction, and a pH value of 6.5 is then established with sodium carbonate.

In a separate reaction, 42 parts of 6-(β-sulfatoethylsulfonyl)-2-aminonaphthalene-1-sulfonic acid are diazotized analogously to the above data. The diazonium salt suspension obtained is added to the prepared solution of the monoazo compound. The pH value is kept at 6 to 7 and the reaction mixture is stirred for a further 3 hours. The disazo compound prepared is isolated by evaporation of the reaction mixture, if appropriate after a clarifying filtration. A black, electrolyte-containing powder is obtained, which contains the sodium compound of the formula

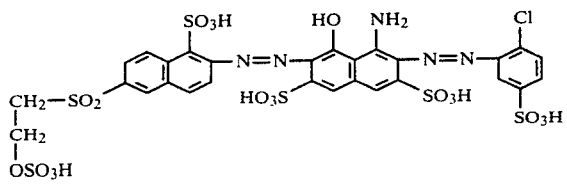

This is a very suitable dye for the dyeing of cellulose-fiber materials according to the known dyeing and printing methods customary in the art and fixing methods current for fiber-reactive dyes; it yields, on these materials, navy blue to blue-tinged black shades with good fastness properties. The dyeings are obtained in good shade constancy, also in the presence of copper ions.

EXAMPLES 4 to 49

The procedure according to the invention is followed for the preparation of the disazo compounds according to the invention which are characterized by their diazo components and by their coupling components in the table of Examples which follows, for example, a procedure analogous to the process variants described in the above Examples, by reaction of the first diazonium compound of the amine mentioned, corresponding to the general formula (2), with 1-amino-8-naphthol-3,6-disulfonic acid as the coupling component in the acidic range and then by reaction of this monoazo compound with the second diazonium salt of the aromatic amine corresponding to the general formula (3) in the weakly acidic to neutral range. These disazo compounds likewise represent good fiber-reactive dyes, which have good to outstanding properties in applied technology and yield dyeings with stable shades and good fastness properties, also in the presence of copper ions; the shades of the dyeings, obtainable with these disazo compounds, which shades can vary in shade according to depth of color, are mentioned in the table for the particular disazo dye according to the invention.

| Example | 1st diazo component according to formula (2)- coupling at pH 0.5–3 | Bivalent coupling component | 2nd diazo component according to formula (3)- coupling at pH 5–7 | Shade of the dyeing |
|---|---|---|---|---|
| 4 | 2-Bromo-4-(β-sulfato-ethylsulfonyl)-aniline | 1-Amino-8-naphthol-3,6-disulfonic acid | 2-Methoxy-5-methyl-4-(β-sulfatoethylsulfonyl)-aniline | green-tinged navy blue to black |
| 5 | 2-Bromo-4-(β-sulfato-ethylsulfonyl)-aniline | 1-Amino-8-naphthol-3,6-disulfonic acid | 3-(β-Sulfatoethyl-sulfonyl)-aniline | navy blue to black |
| 6 | 2-Bromo-4-(β-sulfato-ethylsulfonyl)-aniline | 1-Amino-8-naphthol-3,6-disulfonic acid | 2-Chloro-4-(β-sulfato-ethylsulfonyl)-aniline | navy blue to black |
| 7 | 2-Bromo-4-(β-sulfato-ethylsulfonyl)-aniline | 1-Amino-8-naphthol-3,6-disulfonic acid | 2-Nitro-4-(β-sulfato-ethylsulfonyl)-aniline | green-tinged navy blue to black |
| 8 | 2-Bromo-4-(β-sulfato-ethylsulfonyl)-aniline | 1-Amino-8-naphthol-3,6-disulfonic acid | 2-Sulfo-4-(β-sulfato-ethylsulfonyl)-aniline | green-tinged navy blue to black |
| 9 | 2-Bromo-4-(β-sulfato-ethylsulfonyl)-aniline | 1-Amino-8-naphthol-3,6-disulfonic acid | 4-Vinylsulfonyl-aniline | navy blue to black |
| 10 | 2-Bromo-4-(β-sulfato-ethylsulfonyl)-aniline | 1-Amino-8-naphthol-3,6-disulfonic acid | 4-(β-Chloroethylsulfonyl)-aniline | navy blue to black |
| 11 | 2-Bromo-4-(β-sulfato-ethylsulfonyl)-aniline | 1-Amino-8-naphthol-3,6-disulfonic acid | 4-(β-Thiosulfatoethyl-sulfonyl)-aniline | navy blue to black |
| 12 | 2-Bromo-4-(β-sulfato-ethylsulfonyl)-aniline | 1-Amino-8-naphthol-3,6-disulfonic acid | 4-(β-Acetoxyethylsulfonyl)-aniline | navy blue to black |
| 13 | 2-Bromo-4-(β-sulfato-ethylsulfonyl)-aniline | 1-Amino-8-naphthol-3,6-disulfonic acid | 4-(β-Benzoyloxyethyl-sulfonyl)-aniline | navy blue to black |
| 14 | 2-Bromo-4-(β-sulfato-ethylsulfonyl)-aniline | 1-Amino-8-naphthol-3,6-disulfonic acid | 2-Chloroaniline | green-tinged navy blue |
| 15 | 2-Bromo-4-(β-sulfato-ethylsulfonyl)-aniline | 1-Amino-8-naphthol-3,6-disulfonic acid | 2,4-Dichloroaniline | navy blue to black |
| 16 | 2-Bromo-4-(β-sulfato-ethylsulfonyl)-aniline | 1-Amino-8-naphthol-3,6-disulfonic acid | 4-Amino-benzoic acid | navy blue |
| 17 | 2-Bromo-4-(β-sulfato-ethylsulfonyl)-aniline | 1-Amino-8-naphthol-3,6-disulfonic acid | Aniline-3-sulfonic acid | navy blue |
| 18 | 2-Bromo-4-(β-sulfato-ethylsulfonyl)-aniline | 1-Amino-8-naphthol-3,6-disulfonic acid | Aniline-2,4-disulfonic acid | green-tinged navy blue |
| 19 | 2-Bromo-4-(β-sulfato-ethylsulfonyl)-aniline | 1-Amino-8-naphthol-3,6-disulfonic acid | Aniline-2,5-disulfonic acid | green-tinged navy blue |
| 20 | 2-Bromo-4-(β-sulfato-ethylsulfonyl)-aniline | 1-Amino-8-naphthol-3,6-disulfonic acid | 2-Aminonaphthalene-1,5-disulfonic acid | navy blue to black |
| 21 | 2-Bromo-4-(β-sulfato-ethylsulfonyl)-aniline | 1-Amino-8-naphthol-3,6-disulfonic acid | 2-Chloroaniline-5-sulfonic acid | green-tinged navy blue |
| 22 | 2-Bromo-4-vinylsulfonyl-aniline | 1-Amino-8-naphthol-3,6-disulfonic acid | 4-(β-Sulfatoethylsulfonyl)-aniline | navy blue to black |
| 23 | 2-Chloro-4-(β-sulfato-ethylsulfonyl)-aniline | 1-Amino-8-naphthol-3,6-disulfonic acid | 2-Bromo-4-(β-sulfato-ethylsulfonyl)-aniline | navy blue to black |
| 24 | 2-Chloro-4-(β-sulfato-ethylsulfonyl)-aniline | 1-Amino-8-naphthol-3,6-disulfonic acid | 2-Chloro-4-(β-sulfato-ethylsulfonyl)-aniline | navy blue to black |
| 25 | 2-Fluoro-aniline | 1-Amino-8-naphthol-3,6-disulfonic acid | 4-(β-Sulfatoethylsulfonyl)-aniline | navy blue to black |
| 26 | 2-Bromo-aniline | 1-Amino-8-naphthol-3,6-disulfonic acid | 4-(β-Sulfatoethylsulfonyl)-aniline | navy blue to black |

-continued

| Example | 1st diazo component according to formula (2)-coupling at pH 0.5-3 | Bivalent coupling component | 2nd diazo component according to formula (3)-coupling at pH 5-7 | Shade of the dyeing |
|---|---|---|---|---|
| 27 | 2,3-Dichloro-aniline | 1-Amino-8-naphthol-3,6-disulfonic acid | 4-(β-Sulfatoethylsulfonyl)-aniline | navy blue to black |
| 28 | 2-Chloroaniline-5-sulfonic acid | 1-Amino-8-naphthol-3,6-disulfonic acid | 4-(β-Sulfatoethylsulfonyl)-aniline | green-tinged navy |
| 29 | 2-Methyl-6-chloroaniline-4-sulfonic acid | 1-Amino-8-naphthol-3,6-disulfonic acid | 4-(β-Sulfatoethylsulfonyl)-aniline | red-tinged navy blue |
| 30 | 2-Chloroaniline-5-sulfonic acid | 1-Amino-8-naphthol-3,6-disulfonic acid | 3-(β-Sulfatoethylsulfonyl)-4-methoxy-aniline | green-tinged navy blue to black |
| 31 | 2-Chloroaniline-5-sulfonic acid | 1-Amino-8-naphthol-3,6-disulfonic acid | 3-(β-Sulfatoethylsulfonyl)-aniline | navy blue to black |
| 32 | 2-Chloroaniline-5-sulfonic acid | 1-Amino-8-naphthol-3,6-disulfonic acid | 2-Methoxy-5-methyl-4-(β-sulfatoethylsulfonyl)-aniline | green-tinged navy blue to black |
| 33 | 2-Chloroaniline-5-sulfonic acid | 1-Amino-8-naphthol-3,6-disulfonic acid | 2,5-Dimethoxy-4-(β-sulfatoethylsulfonyl)-aniline | green-tinged navy blue |
| 34 | 2-Chloroaniline-5-sulfonic acid | 1-Amino-8-naphthol-3,6-disulfonic acid | 2-Methoxy-5-(β-sulfatoethylsulfonyl)-aniline | green-tinged navy blue to black |
| 35 | 2-Chloroaniline-5-sulfonic acid | 1-Amino-8-naphthol-3,6-disulfonic acid | 4-(β-Sulfatoethylsulfonyl)-1-aminonaphthalene | green-tinged navy blue |
| 36 | 2-Chloroaniline-5-sulfonic acid | 1-Amino-8-naphthol-3,6-disulfonic acid | 8-(β-Sulfatoethylsulfonyl)-2-aminonaphthalene | navy blue to black |
| 37 | 2-Chloroaniline-5-sulfonic acid | 1-Amino-8-naphthol-3,6-disulfonic acid | 8-(β-Sulfatoethylsulfonyl)-2-aminonaphthalene-6-sulfonic acid | green-tinged navy blue |
| 38 | 2-Chloroaniline-5-sulfonic acid | 1-Amino-8-naphthol-3,6-disulfonic acid | 6-(β-Sulfatoethylsulfonyl)-2-aminonaphthalene | navy blue to black |
| 39 | 2-Chloroaniline-5-sulfonic acid | 1-Amino-8-naphthol-3,6-disulfonic acid | 2-Bromo-(β-sulfatoethylsulfonyl)-aniline | green-tinged navy blue to black |
| 40 | 2,4-Dichloroaniline | 1-Amino-8-naphthol-3,6-disulfonic acid | 2-Bromo-(β-sulfatoethylsulfonyl)-aniline | green-tinged navy blue to black |
| 41 | 2-Chloroaniline | 1-Amino-8-naphthol-3,6-disulfonic acid | 2-Bromo-(β-sulfatoethylsulfonyl)-aniline | green-tinged navy blue |
| 42 | 2-Chloro-5-(β-sulfatoethylsulfonyl)-aniline | 1-Amino-8-naphthol-3,6-disulfonic acid | 2-Choroaniline | navy blue to black |
| 43 | 2-Chloro-5-(β-sulfatoethylsulfonyl)-aniline | 1-Amino-8-naphthol-3,6-disulfonic acid | 2,3-Dichloroaniline | navy blue to black |
| 44 | 2,5-Dichloroaniline-4-sulfonic acid | 1-Amino-8-naphthol-3,6-disulfonic acid | 2,5-Dimethoxy-4-(β-sulfatoethylsulfonyl)-aniline | green-tinged navy blue |
| 45 | 2-Bromoaniline | 1-Amino-8-naphthol-3,6-disulfonic acid | 6-(β-Sulfatoethylsulfonyl)-2-aminonaphthalene-1-sulfonic acid | red-tinged navy blue to black |
| 46 | 2-Chloroaniline-5-sulfonic acid | 1-Amino-8-naphthol-3,6-disulfonic acid | 4-(β-Sulfatoethylsulfonyl)-aniline-2-sulfonic acid | navy blue to black |
| 47 | 2-Chloro-5-(β-sulfatoethylsulfonyl)-aniline | 1-Amino-8-naphthol-3,6-disulfonic acid | 2-Chloro-5-(β-sulfatoethylsulfonyl)-aniline | green-tinged black |
| 48 | 2-Chloroaniline | 1-Amino-8-naphthol-3,6-disulfonic acid | 4-(β-Sulfatoethylsulfonyl)-aniline | green-tinged black |
| 49 | 1-Chloro-2-aminonaphthalene | 1-Amino-8-naphthol-3,6-disulfonic acid | 4-(β-Sulfatoethylsulfonyl)-aniline | green-tinged black |

USE EXAMPLE 1

A cotton fabric is impregnated with an aqueous dye liquor (padded or slop-padded), which contains liter 28 g of the sodium salt, according to the invention, of the disazo compound indicated in the formula in Example 1 (corresponding to 40 g of the dye powder obtained according to Example 1), 30 g of anhydrous sodium sulfate and 16 ml of 32.5% strength sodium hydroxide solution. The impregnated fabric is wrapped around a roller, encased in a plastic film and left to stand for 8 hours at room temperature. The fabric is then soaped and rinsed in the customary manner; a green-tinged black dyeing is obtained, which has good to very good wearing properties and stability to manufacturing processes, such as, for example, fastness to washing, perspiration, rubbing, ironing, solvents, cross-dyeing and acid, as well as a good fastness to light.

USE EXAMPLE 2

20 parts of the disazo compound according to the invention, described in Example 1, are mixed with 80 parts of urea, and the mixture is dissolved in 250 parts of water at a temperature of about 80° C. After the solution has been cooled to 40° C., 400 parts of a neutral, 4% strength aqueous alginate thickening and 15 parts of sodium bicarbonate are stirred in; the whole mixture is then made up to 1,000 parts with further alginate thickening, and is mixed well. A cotton fabric is printed with the printing paste thus prepared, and the fabric is dried at 60° C and then steamed for 10 minutes with steam of 101° to 103° C. in order to fix the dye. The print obtained is finished in the customary manner by soaping and rinsing. A green-tinged navy blue printed sample with the very good wearing properties and stability to manufacturing processes mentioned in Use Example 1 is obtained.

The other disazo dyes according to the invention, described in the previous examples, may be used, for example in identical or similar manner, for the preparation of valuable dyeings and prints.

We claim:

1. A disazo compound of the formula

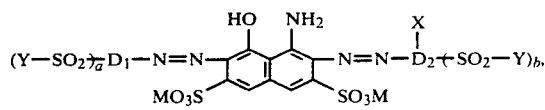

in which

M is hydrogen or an alkali metal;

$D_1$ is the benzene or naphthalene nucleus unsubstituted or, apart from the group $Y-SO_2-$, substituted by one or two substituents selected from the group consisting of fluorine, chlorine, bromine, carboxy, lower alkyl, lower alkoxy and nitro, and/or by one, two or three sulfo groups;

$D_2$ is the benzene or naphthalene nucleus substituted by X defined below, unsubstituted or substituted by the group $-SO_2-Y$ and unsubstituted or substituted by one or two substituents selected from the group consisting of carboxy, lower alkyl and lower alkoxy, and/or by one substituent selected from the group consisting of fluorine, chlorine, bromine and nitro, and/or by one, two or three sulfo groups, $D_1$ and $D_2$ being identical to or different from one another;

X is bonded to $D_2$ in ortho-position to the azo group and is fluorine, chlorine or bromine;

Y is vinyl or β-sulfatoethyl;

a is zero or 1; and b is zero or 1; and the sum of (a+b) is 1 or 2.

2. A compound according to claim 1, in which b is 1, $D_2$ is the benzene nucleus, to which X is bonded in o-position to the azo group, unsubstituted or substituted by lower alkyl, lower alkoxy, chlorine, bromine or sulfo, and M, $D_1$, Y, X and a are defined as in claim 1.

3. A compound according to claim 2, in which M, $D_2$, b, X and Y are defined as in claim 2, and a is 1, $D_1$ is the benzene nucleus, additionally substituted or unsubstituted by one or two substituents selected from the group consisting of lower alkyl, lower alkoxy, chlorine, fluorine, carboxy, sulfo and nitro, the group $-SO_2-Y$ is bonded to the benzene nucleus in m- or p-position to azo group, and the groups $Y-SO_2-D_1-$ and $-D_2-(-X)-SO_2-Y$ are identical to or different from one another.

4. A compound according to claim 2, in which M, $D_2$, b, X and Y are defined as in claim 2, and a is 1, and $D_1$ is the naphthalene nucleus additionally substituted or not substituted by one or two sulfo groups.

5. A compound according to claim 2, in which M, $D_2$, b, X and Y are defined as in claim 2, and a is zero and $D_1$ is monosulfonaphthyl, disulfonaphthyl or trisulfonaphthyl.

6. A compound according to claim 2, in which M, $D_2$, b, X and Y are defined as in claim 2 and a is zero and $D_1$ is phenyl, unsubstituted or substituted by 1 or 2 substitutents selected from the group consisting of sulfo, carboxy, lower alkyl, lower alkoxy, chlorine, bromine and nitro.

7. A compound according to claim 1 in which a is 1 and b is zero, M, $D_1$, Y and X are defined as in claim 1, $D_2$ is the benzene nucleus, which, in addition to X, is substituted by one or two sulfo groups and additionally substituted or not substituted by one substituent selected from the group consisting of lower alkyl, lower alkoxy, nitro and chlorine.

8. A compound according to claim 7, in which M, $D_1$, Y, X, a and b are defined as in claim 7, and $D_2$ is the naphthalene nucleus which, in addition to X, is substituted by at least one sulfo group.

9. A compound according to claim 1 in which a is 1 and b is 0 and M, $D_1$, and X as are defined in claim 1, and $D_2$ is the benzene nucleus which in addition to X is substituted by sulfo.

10. A compound according to claim 1 of the formula

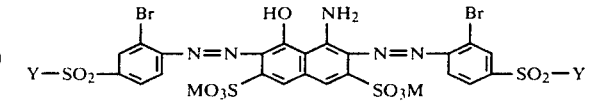

in which M and Y are defined as in claim 1.

* * * * *